(12) United States Patent
Martz et al.

(10) Patent No.: US 6,498,845 B1
(45) Date of Patent: *Dec. 24, 2002

(54) SYSTEM FOR CONNECTING CALLS ON PHYSICALLY DISTINCT SERVERS ON AN ADVANCED INTELLIGENT NETWORK

(75) Inventors: Basia M. Martz, Wheaton, IL (US); Dennis F. Meyer, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/276,718

(22) Filed: Mar. 26, 1999

Related U.S. Application Data

(63) Continuation-in-part of application No. 08/898,266, filed on Jul. 22, 1997, now Pat. No. 6,088,439.

(51) Int. Cl.⁷ .................................. H04M 7/00
(52) U.S. Cl. .................... 379/230; 379/220.01; 379/229
(58) Field of Search .......... 379/220.01, 221.08–221.12, 379/202.01–207.01, 221.02, 229, 230, 221.13

(56) References Cited

U.S. PATENT DOCUMENTS 5,550,906 A * 8/1996 Chau et al. ................ 379/207
6,088,439 A * 7/2000 Martz et al. ............ 379/220.01

\* cited by examiner

Primary Examiner—Scott L. Weaver
Assistant Examiner—Joseph T. Phan
(74) Attorney, Agent, or Firm—Harness, Dickey & Pierce, P.L.C.

(57) ABSTRACT

A bridge connection is made between the interfaces on physically distinct telecommunication servers such that the two ends of the bridge can be used to connect existing calls that are terminated on each of the servers. To provide the bridge connection, a call using a standard outgoing PRI trunk on one of the servers is made through the public switched telephone network (PSTN) to an incoming PRI trunk on the other server. When a bridge connection is required one of the servers is queried for its directory number, which is any number that the PSTN has assigned to equipment in that server. The other server is then instructed to make a call to that number. When the called server recognizes the incoming call as bridge connection, its answers the call. The calling server then associates the bridge connection with the pending action, using information encoded in the out-of-band signal with which the call between the servers was established. In this manner, calls terminating on distinct servers can be connected without the need for additional hardware.

9 Claims, 3 Drawing Sheets

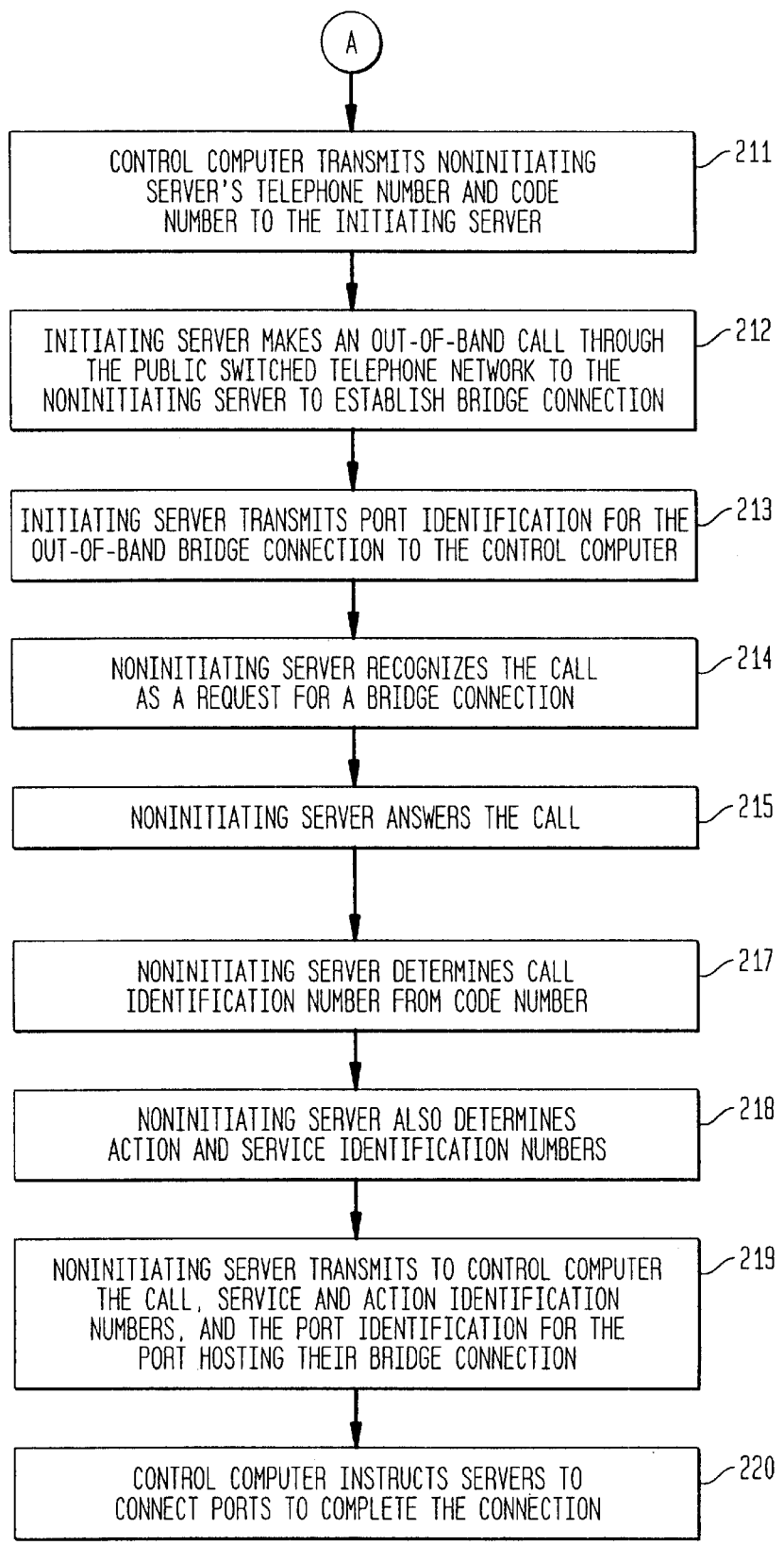

SYSTEM FOR CONNECTING CALLS ON PHYSICALLY DISTINCT SERVERS ON AN ADVANCED INTELLIGENT NETWORK

This application is a continuation-in-part of U.S. patent application. Ser. No. 08/898,266, filed on Jul. 22, 1997 now U.S. pat. No. 6,088,439 and entitled "A System for Connecting Calls on Physically Distinct Servers on an Advanced Intelligent Network." The entire disclosure set forth in that application is incorporated herein by reference.

BACKGROUND OF THE INVENTION

The invention relates, generally, to Advanced Intelligent Network (AIN) systems and, more particularly, to a method and apparatus for connecting calls on physically distinct telecommunications servers in such systems.

AIN systems are generally known for providing enhanced voice and data network services. A typical AIN architecture distributes service logic, data and service assistance functions throughout the telecommunications network. AIN networks provide enhanced services such as, without limitation, voice mail, single number reach, speech recognition, call screening and the like. Typically, a call requiring enhanced services provided by the AIN activates a trigger in a central office switching system. Such triggers can be initiated when a caller goes off-hook, or according to dialing plans such as office dialing plans, individualized dialing plans, dialed feature codes or the like. Many other trigger types are available such as those used on trunk facilities or the feature buttons based on ISDN-telephone sets. Once a trigger has been set, the call setting that tigger is connected to the AIN system where appropriate call processing occurs based on the trigger and possible additional information provided by the calling party. Typically, the call is connected to a service control unit that consists of a control computer, a fault tolerant switch fabric unit and a plurality of service circuits connected to the switch fabric. The service circuits provide the AIN service capabilities such as voice announcements, dual-tone multifrequency (DTMF) receivers, text-to-speech conversion, speech recognition, mail boxes and the like. The switch fabric unit physically connects a calling party to one of the service circuits or to another party, as necessary to provide the appropriate AIN service.

In a conventional AIN architecture, a call is routed to the service control unit from a switching system as a result of the activation of a trigger (for example, the dialed directory number, call forward on busy, or the like). The control information for the call is sent to the control computer which determines the service to be performed and instructs the switch fabric unit to sequentially connect the call to one or more service circuits as appropriate for the applicable service. After the requested service has been performed the call is either completed or returned to the originating switching system.

The switch fabric units typically consist of a digital switch fabric with fully duplicated time slot interchangers such as a switch fabric using 5ESS® switching systems manufactured and sold by Lucent Technologies Inc. While such switch fabrics are extremely robust, they are also relatively expensive. Moreover, because such switch fabrics are designed to handle the traffic of a network switching system, they are not scaleable to meet the varying traffic demands of an AIN.

As a result, another conventional AIN has been developed that replaces the switch fabric unit with a plurality of physically distinct telecommunication servers consisting of personal computers having standard computer telephony hardware and interfaces. The telecommunication servers perform the routing function of the switch fabric units but are less expensive, scaleable and ultimately provide greater capacity than the switch fabric units. One problem with such distributed systems is that calls terminating at different servers cannot be connected when the need arises because the servers operate relatively independently in providing AIN service. Alternatively, hardware resources must be prereserved in order to permit inter-server connections. To eliminate these problems, the prior art uses a separate switch fabric located in front of the servers or dedicated physical interfaces between the servers to handle interserver connections. In either of these scenarios additional hardware is required, resulting in wasted resources, higher costs, lower reliability, and lower capacity.

Thus, an improved system for connecting calls on physically distinct servers in an AIN is desired.

SUMMARY OF THE INVENTION

The system of the invention makes a bridge connection between respective interfaces on physically distinct telecommunication servers such that the two ends of the bridge can be used to. connect existing calls that are terminated on each of the servers. To provide the bridge connection, a call using a standard outgoing primary rate interface (PRI) trunk on one of the servers is made through the public switched telephone network (PSTN) to an incoming PRI trunk on the other server. The servers each designate a directory number for such calls from any of the directory numbers that the PSTN associates with any of the lines terminated on that server. When a bridge connection is required, one of the servers is queried for its designated special directory number. The other server is then instructed to make a call to that number, the call carrying an encoded element on an out-of-band signal that carries information specific to the call. When the called server recognizes the incoming call by the presence of the encoded element, it answers the call. The called server then uses the encoded element to associate the bridge connection with the pending action. In this manner, calls terminating on distinct servers can be connected without the need for additional hardware.

BRIEF DESCRIPTION OF THE DRAWINGS

FIGS. 2A and 2B collectively show a flow chart illustrating the operation of the system of the invention.

DETAILED DESCRIPTION OF THE INVENTION

Figure 1:
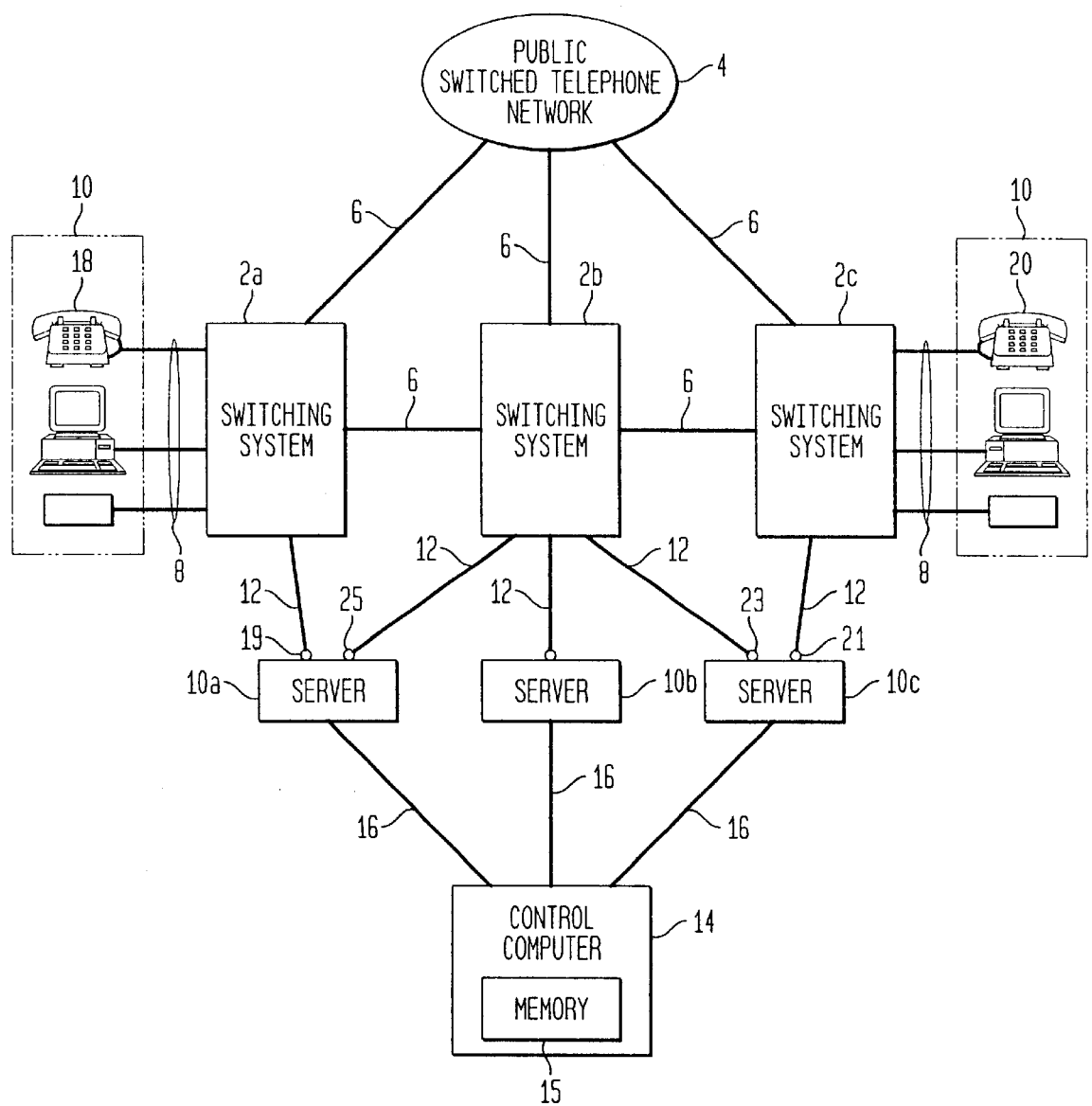
FIG. 1 is a block diagram of an AIN network architecture in which the system of the invention can be used.

Referring more particularly to FIG. 1, an exemplary network architecture in which the system of the invention is used is shown consisting of a number of switching systems 2a, 2b and 2c connected to one another (the illustration of three switching systems here is strictly by way of example) and to other switches in the public switched telephone network (PSTN) 4 over interoffice trunking 6. The switching systems may, for example, be the 5ESS® switching system manufactured and sold by Lucent Technologies Inc., or any similar switch. Furthermore, the switching systems 2a, 2b, and 2c are meant to illustrate switches which are part of the PSTN 4. Certain of the switching systems, known as central office switching systems, also host customer premise equipment (CPE) 10 such as telephones, personal computers, facsimile machines or the like over customer lines 8.

To provide the AIN services, a plurality of telecommunication servers 10a, 10b and 10c (again, the illustration of three telecommunication servers here is strictly by way of example) are connected to selected ones of the switching systems 2a–2c via PRI trunks 12. Note that not all of the telecommunication servers are connected to all of the switching systems, and some of the switching systems may not be connected to any AIN servers. Telecommunication servers 10a–10c can be, for example, personal computers, based on P5 or P6 processors (manufactured and sold by Intel Corporation) or other similar processors, and include standard computer telephony hardware for answering and processing AIN telephone calls, as is known in the art. A control computer 14 having a memory 15 is connected to each of the servers 10a–10c over data links 16, a connection over an industry standard local area network (such as Ethernet, or the like. It will be appreciated that while a specific configuration of the architecture is illustrated for illustrative purposes, a specific AIN architecture may vary provided that distributed call processing is provided using multiple telecommunication servers. It will further be appreciated that a typical AIN can include other elements, such as service management systems, service control points, and the like that are not shown and are not specifically involved in the system of the invention.

As previously explained, AIN provides enhanced customer services such as, without limitation, voice mail, single number reach, speech recognition services, conferencing, and the like. In operation, when a call is received at a switching system provided with an AIN services platform and that call sets an AIN trigger, the call is connected to one of the servers handling AIN calls for that switching system over a PRI trunk 12. The server processes the call and provides the appropriate enhanced service as is known in the art. When a normal telephone call comes into a server, the server informs a well-known process on the control computer that that server has a call for a particular directory number (DNX). The control computer 14, upon receipt of the call information, determines the service to be performed for calls for DNX. The service is identified by a 5-digit service identification number, and a reply is sent from the control computer 14 to the respective server, indicating that the call should be sent to service identification number Y. The server then sends a message to process S on the control computer 14 informing the control computer 14 that it has a new call on port N for DNX, and that this call has been assigned call identification number C. The call identification number C is assigned from a range of 10-digit numbers assigned to the server by the control computer 14 upon initialization of the server.

The service logic then initiates a new call instance. Each call can be executing multiple activities concurrently; for example, it can be playing a voice file to the caller while concurrently listening for DTMF digits or voice commands with Automatic Speech Recognition circuits. Each activity is assigned a 10-digit action identification number, so that various events related to the activity (such as caller's speech recognized as a 'YES') can be correctly associated with respective activities. According to the system of the invention, one of these contemplated activities is "make a bridge call from server X to server Y" which initiates the system of the invention.

In certain situations, calls can be received on two different servers such that the calls must be connected. One situation illustrating this scenario will now be described by way of example.

Assume that customer A initiates a call from telephone 18 to obtain messages from customer A's voice Switching system 2a connects telephone 18 to server 10a over PRI trunk 12 where server 10a connects telephone 18 to customer A's voice mail. At the time the connection is made, server 10a informs control computer 14 of the port 19 on server 10a that is hosting customer A's call as previously described. While customer A is accessing his or her voice mail, caller B attempts to contact customer A from telephone 20 where customer A has single number reach service. Note, in this scenario caller B need not be an AIN customer because the trigger is a call attempt to customer A from any caller. Single number reach service is a service by which the AIN will sequentially "ring" each of customer A's communication devices upon caller B's dialing of a single directory number. Typically, a first device such as the customer's home telephone is rung. If there is no answer at the called customer's home, a second device such as a mobile phone is rung. Finally, if there is no answer there, a third device such as a pager is activated. The customer devices that are called and the order in which they are called typically can be specified by the customer. Because single number reach is performed in the AIN, caller B's call is routed to server 10c. As before with server. 10a, at the time the connection is made, server 10c informs control computer 14 of the port 21 on server 10c that is hosting the call.

Thus, customer A at telephone 18 is connected to server 10a and caller B at telephone 20 is connected to server 10c. Because caller B is attempting to reach customer A, it would be desirable to connect telephone 18 to telephone 20. However, because server 10a and server 10c are physically distinct network elements that typically operate independently of one another, they do not have information or facilities necessary to create a connection between caller B's telephone 20 and customer A's telephone 18.

It will be appreciated that call scenarios other than that described above can result in the need for inter-server connections and that such scenarios are fully contemplated as falling within the scope of the present invention.

Figure 2A:
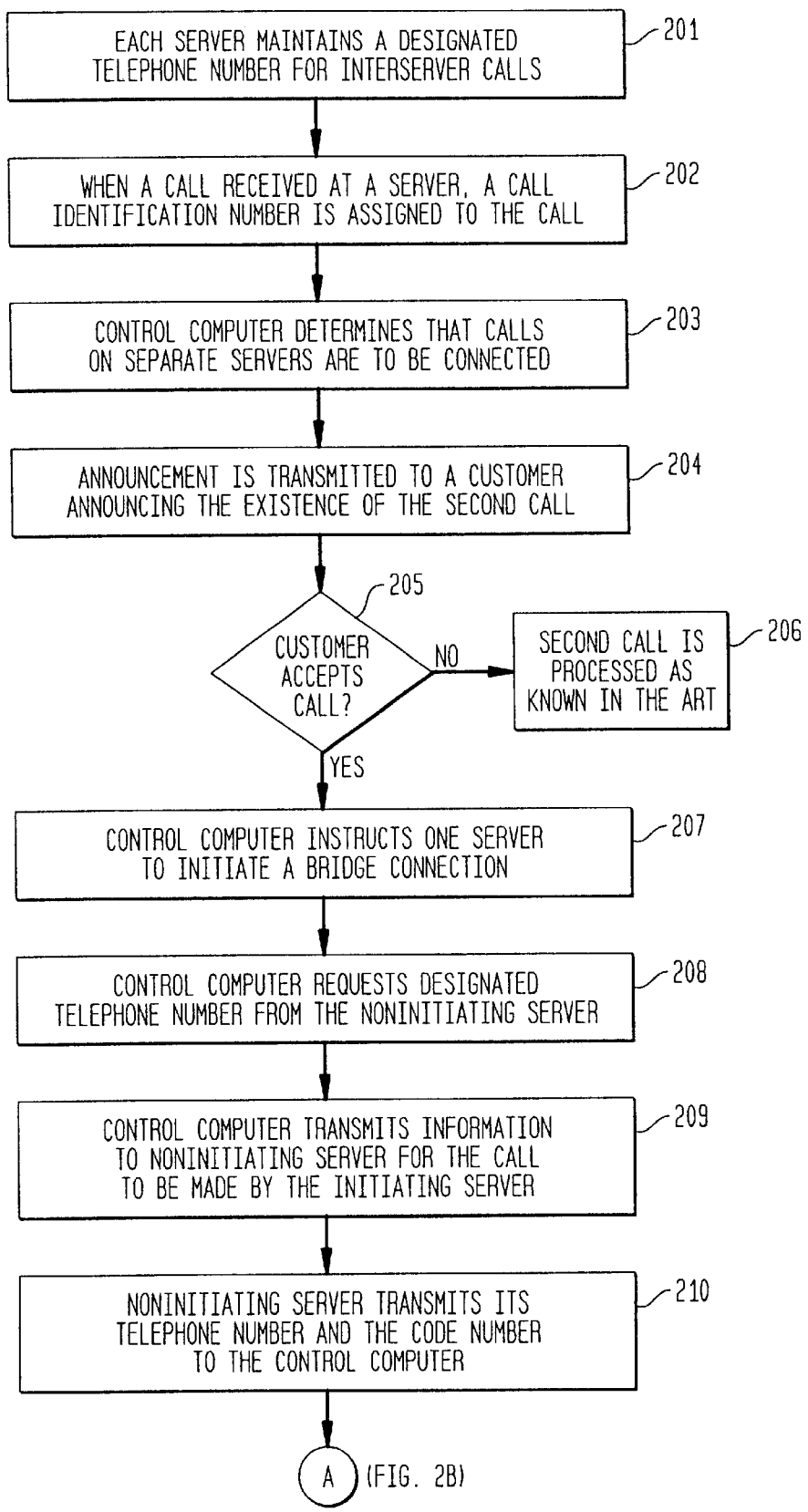

The system of the invention has therefore been developed to connect such inter-server calls as will be described with reference to FIGS. 1, 2A, and 2B. Each server in the AIN maintains at least one directory number that is for bridge connections for inter-server connections (block 201). This directory number can be any of the numbers that the PSTN 4 associates with telephone lines connected to that server. When a call is received at any server, that server assigns a 10-digit call identification number (selected from a set of 10-digit numbers assigned to that server by the control computer 14 for this purpose) to that call that survives for the duration of that call's activity in the AIN (block 202). The call identification number is retained both at the control computer 14 and at the respective server handling the call. Thus, in the example above, when the call from telephone 18 is received at server 10a, server 10a assigns a first 10-digit call identification number for that call and transmits that number to control computer 14. When the second call from telephone 20 is received at server 10c, server 10c assigns a second 10-digit call identification number to that call and transmits that number to control computer 14. The 10-digit call identification numbers are associated in the memory of control computer 14 with a 10-digit subscriber identification number permanently assigned to each subscriber. Because in the present scenario both calls are sent to the AIN based on triggers for customer A, both call identification numbers are associated with the subscriber identification of customer A. However, in the illustrated scenario the second call identification number is not necessary for the operation of the system of the invention.

When server 10c attempts to complete the call from caller B to customer A, control computer 14 determines that customer A is connected to server 10a by comparing the subscriber information received from telephone 20 with the subscriber information stored in memory 15 that is associated with the call from telephone 18 (block 203). Control computer 14 informs server 10a of the existence of caller B's call such that server 10a transmits an announcement to telephone 18 announcing the call from caller B (block 204).

Customer A can either accept or reject the call from caller B by, for example, pressing appropriate buttons on telephone 18 or by verbalizing the appropriate response (block 205). If the call is rejected by customer A, the call from caller B is not connected to customer A and is, for example, directed to voice mail, terminated, or is otherwise processed as is known in the art (block 206). If the call from caller B is accepted by customer A, control computer 14 instructs one of server 10a and server 10c to initiate a bridge connection therebetween (block 207). Either server hosting the respective calls to be connected can initiate the bridge connection, and the selection of the actual server that initiates the bridge connection may be based on traffic conditions, server load, or default designations. For purposes of explanation here, assume that control computer 14 selects server 10c (the initiating server) to initiate the bridge connection.

The control computer 14 requests from server 10a the telephone number that server 10a uses for bridge calls (block 208). The control computer 14 also transmits to server 10a the 5-digit service identification number, the 10-digit call identification number for the call about to be made by server 10c, and the 10-digit action identification number it has assigned to the bridging activity (block 209).

Server 10a responds by transmitting the designated telephone number and a short length (e.g., two-digit) code number (associated with, collectively, the 5-digit service identification number, the 10-digit call identification number, and the 10-digit action identification number) to control computer 14 (block 210). The short length code number is an arbitrary number used as a shorthand reference for, collectively, the 5-digit service identification number, 10-digit call identification number, and the 10-digit action identification number. The server 10a maintains a table correlating the 5-digit service identification number, 10-digit call identification number, and 10-digit action identification number to a respective short length code number. Control computer 14 transmits server 10a's designated telephone number and the short length code number to server 10c (block 211) and server 10c makes a standard call through the public switched network to server 10a using PRI out-of-band signaling using server 10a's designated telephone number (block 212). The standard call includes an encoded element associating the bridge connection with the pending action. Server 10c also transmits the port number 23 on server 10c hosting the bridge connection call to control computer 14 (block 213). Server 10a recognizes the call as a request for a bridge connection based on the presence of the specially encoded information element (block 214). Server 10a answers the call from server 10c (block 215).

Server 10a then queries its local data base to determine the call identification number associated with the short length (for example, two-digit) code number received from server 10c (block 217) and contained in the specially encoded information element. Server 10a also determines the 5-digit service identification number that identifies the AIN service being performed (e.g., single number reach, as described here) and the 10-digit action identification number that identifies the particular action being taken for a given call (block 218).

It is noted that the action can change for a given call, and that a call may have more than one action running concurrently. Moreover, the service identification number is fixed and identifies a process on the control computer where each service can handle many concurrent calls, each of which may be doing multiple actions. Once server 10a obtains this information, it transmits the call identification number, service identification number, action identification number, and the port identification for the port 25 hosting the bridge connection to control computer 14 (block 219). Control computer 14 then instructs server 10c to connect port 21 to port 23 and server 10a to connect port 19 to port 25 (block 220). Once these ports are connected by the respective servers, the connection between telephone 18 and telephone 20 is completed.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method for connecting calls on physically distinct servers in an advanced intelligent network, comprising the steps of:

receiving a first call on a first server by way of a primary rate interface;

receiving a second call on a second server by way of a primary rate interface;

determining that the first call is to be connected to said second call;

transmitting a telephone number from said first server to said second server, said telephone number being designated by said first server for inter-server connections;

said first server making a call to said second server using said telephone number to establish a connection between the first and second servers over a public switched network;

said first and second server exchanging call identification information using out-of-band signaling; and said first server and said second server associating said connection with the first call and second call, respectively.

2. The method according to claim 1, further including the step of a control computer requesting the telephone number from the first server and providing the number to said second server.

3. The method of claim 1, further including the step of a control computer transmitting to said first server a call identification number for the second call.

4. The method of claim 1, further including the step of transmitting a code number corresponding to a call identification number for the first call to said second server.

5. The method of claim 1, wherein the connection is an out-of-band call made through the public switched telephone network.

6. The method according to claim 1, wherein the step of determining includes the step of requesting acceptance of said connection by a customer.

7. The method of claim 1, wherein the step of associating said connection includes the steps of connecting said first and second calls to said connection at said first and second servers, respectively.

8. In a system comprising a plurality of switching systems in a public switched telephone network connected to an advanced intelligent network, said advanced intelligent network including a plurality of servers connected to the switching systems over a plurality of primary rate interface trunks and a control computer connected to said servers, a method for connecting calls on said server comprising the steps of:

receiving a first call on a first server by way of a primary rate interface;

receiving a second call on a second server by way of a primary rate interface;

transmitting a call identification number from said control computer to said first server, said first server associating the call identification number with a code;

transmitting a designated telephone number to said control computer, said telephone number being a number assigned by the public switched telephone network to said first server, and transmitting said code associated with the call identification number from said first server to the control computer;

transmitting said telephone number and said code to said second server;

said second server making a call to said first server using said telephone number to establish a connection between the first and second servers via at least one of said switching systems;

transmitting said code from the second server to the first server using out-of-band signaling;

said first server using said code and identifying said call identification number associated with that code;

said first and second servers connecting said first call and said second call to said connection, respectively, to complete the inter-server bridge connection.

9. In a system comprising a plurality of switching systems in a public switched telephone network connected to an advanced intelligent network, said advanced intelligent network including a plurality of servers connected to the switching systems over a plurality of primary rate interface trunks and a control computer connected to said servers, a method for connecting calls on said servers comprising the steps of:

receiving a first call on a first server by way of a primary rate interface;

receiving a second call on a second server by way of a primary rate interface;

transmitting a call identification number from said control computer to said first server;

transmitting a telephone number to said control computer, said telephone number being a number assigned by the public switched telephone network to said first server, and said call identification number from said first server to the control computer;

transmitting said telephone number and said call identification number to said second server;

said second server making a call to said first server using said telephone number to establish a connection between the first and second servers via at least one of said switching systems;

transmitting said call identification number from the second server to the first server using out-of-band signaling;

said first and second servers connecting said first call and said second call to said connection, respectively, to complete the inter-server bridge connection.

* * * * *